Patented Feb. 3, 1931

1,791,430

UNITED STATES PATENT OFFICE

JOHN W. ROBERTS, OF WASHINGTON, DISTRICT OF COLUMBIA

FUNGICIDE AND BACTERICIDE

No Drawing.    Application filed October 12, 1928.    Serial No. 312,197.

(GRANTED UNDER THE ACT OF MARCH 3, 1883, AS AMENDED APRIL 30, 1928; 370 O. G. 757)

This application is made under the act approved April 30, 1928, and the invention herein described may be manufactured and used by or for the Government for governmental purposes without payment to me of any royalty thereon. I hereby dedicate the invention herein described to the free use of the public, to take effect upon the grant of a patent to me.

My fungicide and bactericide consists of the following ingredients in approximately the proportions stated:

Zinc sulphate four pounds; hydrated lime three to four pounds; water fifty gallons; and lime casein one-half pound, or alum (aluminum potassium sulphate) one and one-half pounds, or other substances adapted to increase the suspension and spreading power of the fungicide and bactericide.

These sprays may be described as a Bordeaux mixture in which zinc sulphate is substituted for copper sulphate and to which, in the one case, lime casein is added, and in the other case, aluminum potassium sulphate is added for the purpose of holding the mixture in suspension and also as a spreader. The sprays may also be described as a solution of zinc salt from which zinc hydroxide is precipitated out by the addition of an hydroxide, such as calcium hydroxide. The suspension and spreading power may be aided by the addition of substances such as lime casein or aluminum potassium sulphate.

These sprays have been used for the control of the disease of the peach commonly known as bacterial spot or bacteriosis and caused by *Bacterium pruni*. Experiments indicate that they can be successfully used for this purpose and, perhaps, also for the control of other peach diseases, such as scab and brown rot, which are caused by fungi. It is also possible that diseases of other plants may be controlled by these sprays. No injury to peach foliage has been noted, even when the applications of the spray have been heavy.

The essential ingredients could be mixed together dry and added to the water when needed. The zinc compound and the hydrated lime may be mixed together, ground very finely and applied dry by means of a duster or blower.

The zinc sprays also act as stimulants to peach trees. The foliage of sprayed trees is invariably a darker green than that of unsprayed trees.

It will be understood from the foregoing that my invention consists of a fungicide and bactericide comprising zinc sulphate and hydrated lime to which may be added, if desired, a substance that will add to the suspension and spreading power of the product and to which may also be added water, if desired, to produce a spray. My invention also comprises a method for the control of fungicides and bactericides, particularly in peach trees, by spraying plants and trees affected with fungi and bacteria with the above described materials.

I claim:
1. A fungicide and bactericide comprising zinc sulphate and lime.
2. A fungicide comprising zinc sulfate and lime.

JOHN W. ROBERTS.